Figure 1:
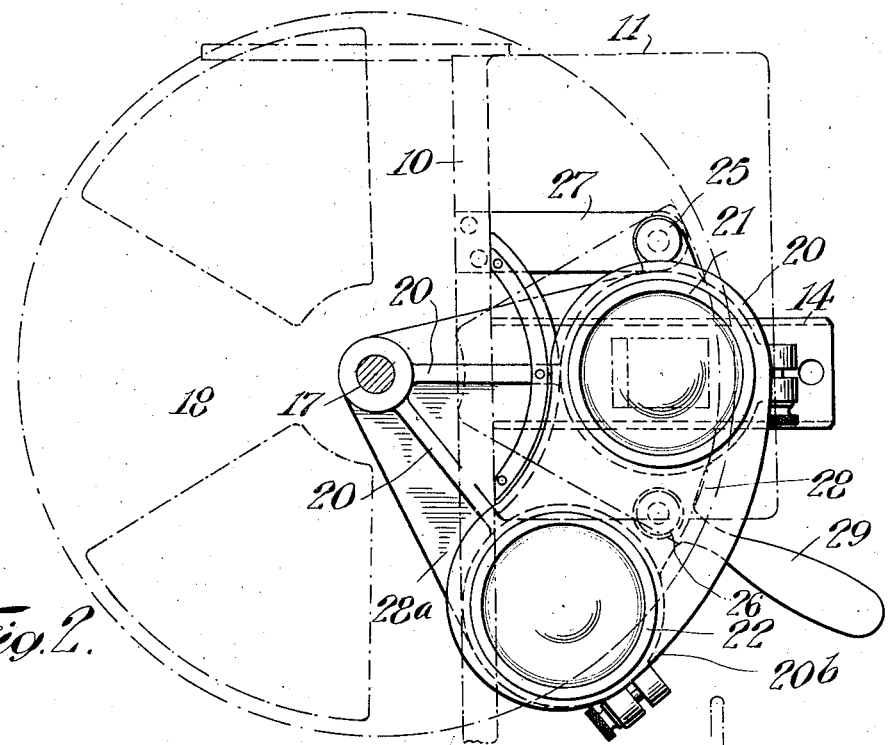

Oct. 24, 1933.  A. DINA  1,932,204
COMPOUND OPTICAL SYSTEM FOR MOTION PICTURE PROJECTION MACHINES
Filed Dec. 12, 1928    3 Sheets-Sheet 1

Inventor
Augusto Dina
By his Attorney
Howard W. Dix

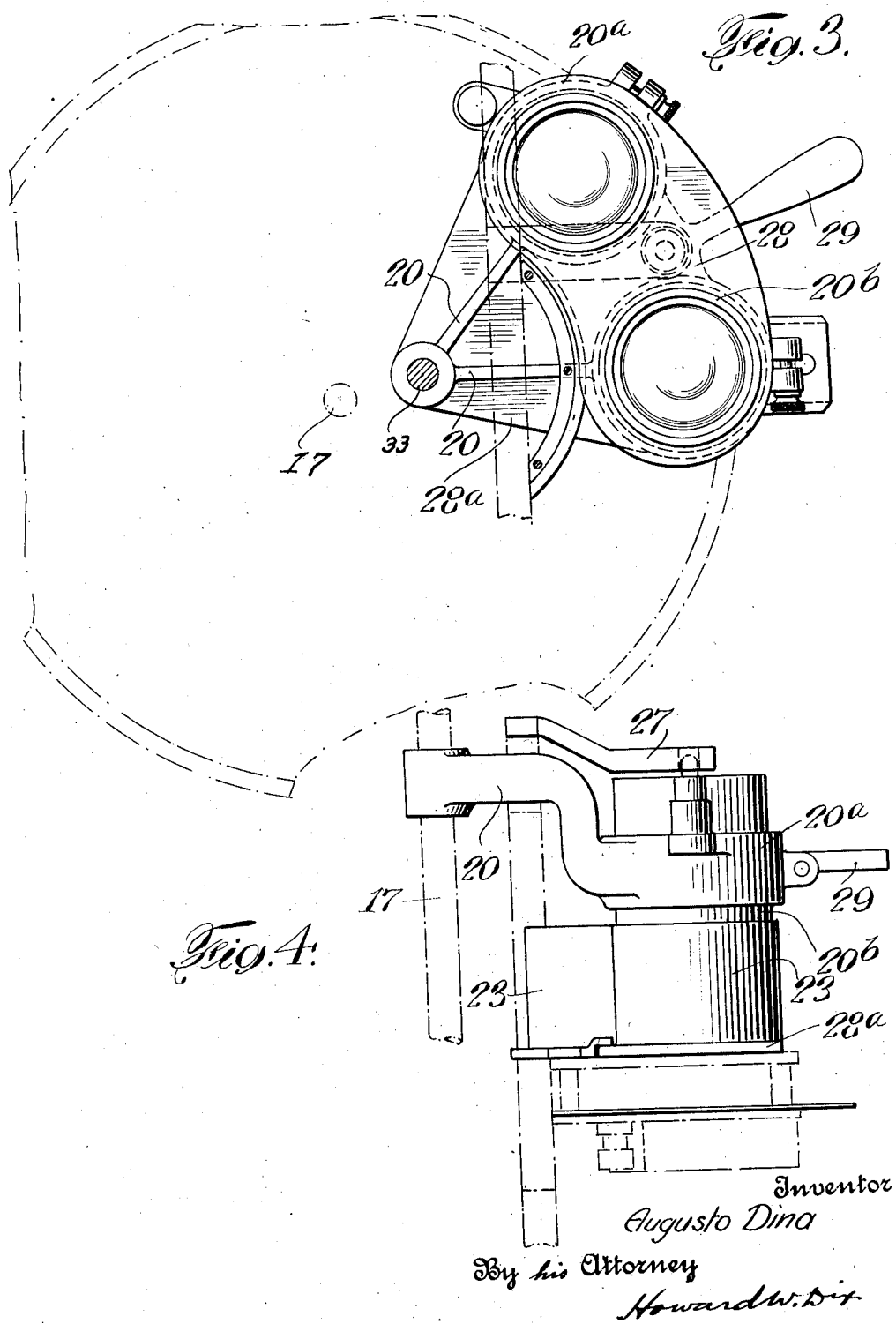

Oct. 24, 1933.  A. DINA  1,932,204
COMPOUND OPTICAL SYSTEM FOR MOTION PICTURE PROJECTION MACHINES
Filed Dec. 12, 1928  3 Sheets-Sheet 3
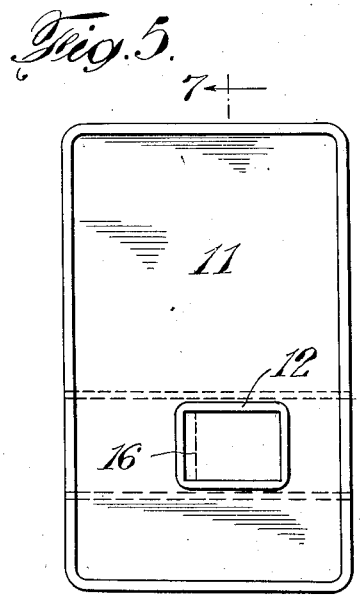
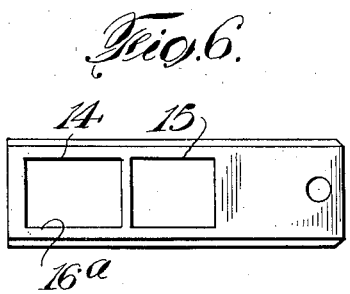
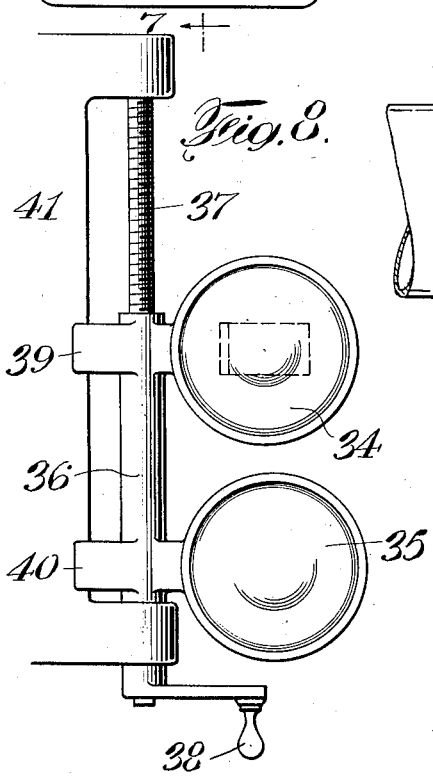
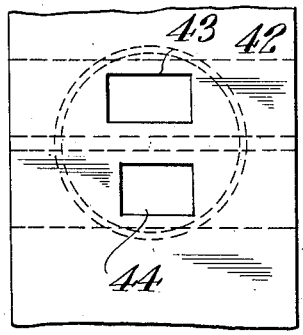
Inventor
Augusto Dina
By his Attorney
Howard W. Dix Patented Oct. 24, 1933

1,932,204

UNITED STATES PATENT OFFICE 1,932,204

COMPOUND OPTICAL SYSTEM FOR MOTION PICTURE PROJECTION MACHINES

Augusto Dina, Jersey City, N. J., assignor to International Projector Corporation, New York, N. Y., a corporation of Delaware Application December 12, 1928
Serial No. 325,565

5 Claims. (Cl. 88—24)

This invention relates to projection machines and has particular reference to motion picture projectors and especially those intended for use with more than one type of film, as may be instanced by the ordinary type of film and by the film having one edge provided with the "talking" strip.

In the motion picture field today, since the so-called talking-movies have come so strongly into vogue, it requires the provision of separate projectors for the modified film employed therewith, or that the standard machine be adapted to be used with the new type film while still being able to project the old type of film when desired.

Since the film which carries the sound striata has a smaller picture area than before, and generally a picture area that is unsymmetrically smaller, it is obvious that, as the centers of the picture areas vary in the aperture opening, the centers of the optical system must be adapted to maintain alinement with the picture section if clarity and faithful projection are to be obtained. Also the aperture opening itself must be varied in size so as to permit the covering of the sound striata so that they will not be projected as the picture part of the film is being projected.

The objects of the invention include the provision of simple and efficient means whereby the optical system or systems and the aperture openings may always be maintained in the proper relation to the film no matter what type of film is being used.

A further object is to provide simple means whereby the aperture sizes may be altered and the optical system changed with the utmost ease and dispatch requiring a minimum of time to make the change, and therefore a minimum of interruption to the running of the picture program.

It is another object of this invention to provide an improved projection apparatus which is capable of projecting the normal size film, and which may also project without noticeable interruption a smaller film and to have this second projection made on exactly the same sized screen area and with the same screen center as the first screen projection.

Further and more specific objects, features, and advantages will more clearly appear from the detailed description given below when taken in connection with the accompanying drawings which form part of the specification.

For the purpose of clear understanding, it may be stated that when the projection machine is changed to project the talking movie film, the aperture opening must be changed in size and the optical system must also be changed. The change in size of aperture is due to the fact that the sound striata are to be covered while the film is passing the projection aperture. This covering reduces the width of the film but changes no other dimension thereof, consequently there is a new center of a smaller sized film for projection and a new center of picture on the screen. This new center of picture on the screen is objectionable and one of the remedies is to shift the projecting lens so that its axis aligns with the center of the smaller film and thereby obtains the full use of the lens.

It is, however, desirable to make the change from the old or normal size film to the talking-movie size without changing the center of projection on the screen nor to change the area of the projection on the screen. The invention herein produces such advantageous results, and the changes may be made, if desired, so that they are not noticeable on the screen.

In the form of invention herein, the apparatus preferably provides two sizes of projection aperture openings and two sets of projection lenses, one for use with each aperture opening. The aperture openings are preferably provided by a single operative plate which has the two sized openings, and arrangements are provided so that the plate may be shifted in order to have one size effective.

Figure 2:
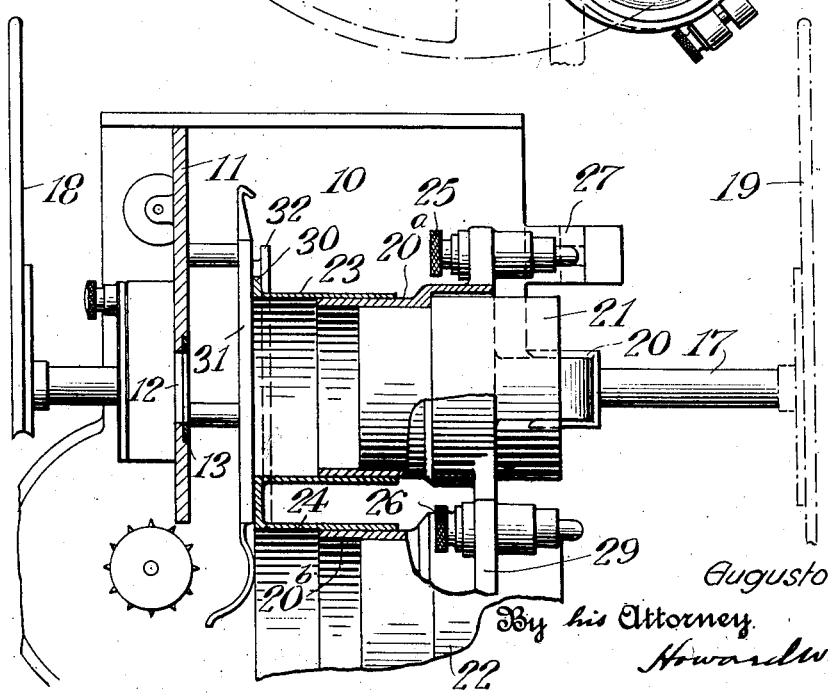

The drawings herewith illustrate the preferred embodiment of the invention, in which, Fig. 1 is an elevational view of part of the projector showing a preferred form of the invention, Fig. 2 is a side elevational view, partly in section, of the device shown in Fig. 1 as viewed from the right in Fig. 1, Fig. 3 is a view similar to Fig. 1 showing the lenses shifted to a different position, Fig. 4 is a plan view of the device shown in Fig. 1, Fig. 5 is an elevational view of part of the projection apparatus, showing the projection aperture, Fig. 6 is an elevational view of an aperture plate with two different sized openings therein, Fig. 7 is a vertical section taken on the line 7—7 of Fig. 5, Fig. 8 is a partial elevational view of a modified form of the invention, Fig. 9 is a somewhat diagrammatical view of a still further modification of the invention, and, Fig. 10 is an elevational view of the aperture opening plate shown in Fig. 9.

In what is considered to be the preferred form of the invention, as shown in Figs. 1 to 5 inclusive, the projection head is provided with a vertical longitudinally extending wall 10 supporting the lens combinations, the shutter shaft and, as well, a transverse wall 11 which has the aperture plate mounted therein and is provided with the usual aperture opening 12, see Fig. 5. This aperture opening is of the standard or normal size in which the standard film is adapted to register. The back of the wall 11 is provided with a bevelled slot 13 in which a slide-plate 14 may be disposed when desired. This plate 14 has an opening 15 therein which is of the same height as aperture 12 but is not quite so wide. When plate 14 is in the slot 13 and the opening 15 is alined with the aperture opening 12, the difference in width is indicated by the dotted line 16 in Fig. 5. This slide plate 14 may also be provided with an aperture 16a of the same size as the aperture 12 in the plate 11, and in this case the slide plate 14 need not be removed from the wall 11 but may be slid back and forth to register one aperture or the other as is desired.

Referring now to Figs. 1 to 4 inclusive, it will be noted that there is provided a shaft 17 which at its rear end supports a shutter 18, and which may also have a shutter 19 at its forward end as well, or as an alternative arrangement. In the form shown in Figs. 1 and 2 this shutter shaft also acts as a support for a pivoted frame formed by arms 20, having collars 20a and 20b embracing spaced lens combination units. These units comprise lenses 21 and 22 and are slidably associated with tubes 23 and 24 on a sector-shaped plate 28a. The units are provided with latch bolts 25 and 26 which are adapted to engage in a hole in a latch plate 27 fastened to the wall 10. The lenses are connected by a strap 28 to which is connected a handle 29 whereby the lenses and the plate 28a may be moved to one position or the other, and then temporarily fastened therein.

The plate 28a is provided with an inwardly turned flange 30 which lies between a film gate 31 and a spaced flange plate 32 fastened thereto. By reason of the tubes 23 and 24 the film gate 31 may be moved to film-engaging position. Thus an enclosed path is maintained for the projection light.

Considering Fig. 1 it will be observed that the center of the lens 21 is at such a distance from the center of the shaft 17 that when this lens is swung into alinement with the aperture opening in the wall 11, its optical center will be in line with the center of the standard opening 12. Similarly, the center of the lens 22 is such a distance from the center of the shaft 17 that when this lens is swung up to the position shown in Fig. 3 its optical center will be in alinement with the center of the modified opening 15 in the plate 14. By means of the latch bolts 25 and 26 the lenses may be locked in either of the above mentioned positions. Also by means of the engagement of the flange 30 above described, the lens mount and its supporting plate 28a and arms 20 will be kept in engagement with the plate 32. The telescopic relation between the lenses and the tubes 23 and 24 permit the plate 32 to be moved without disturbing the position of the lenses. Thus, regardless of whether a standard film is used or one which is modified as to its dimensions, such as those used in talking moving pictures, the lenses may be quickly and easily shifted to maintain the optical center of the projector in line with the physical center of the aperture opening whether it is the standard one or a modified one.

While the sector-shaped plate 28a is shown in Fig. 1 as supported from the shutter shaft 17, reference to Fig. 3 will indicate that a separate point 33 of support may be used and that it will off-set from the shaft supporting the arms 20.

To adapt the machine for a standard film, the operator will merely adjust the lens 21 in alinement with the aperture opening and will either take out the plate 14 or move it so that the aperture 16a therein is in alinement with the aperture 12 in the wall 11. When a modified or talking movie film is employed, the operator will shift the lens 22 into position and will slide the plate 14 until the aperture 15 therein is in alinement with the opening 12 in the plate 11. It will be seen that the aperture opening 16a and lens 21 give a projection area on the screen of a definite amount and with a definite center on the screen. With the change to the smaller aperture opening 15 and the introduction of lens 22, which has a different focal length, it is found that the same size projection screen area and the same center of screen is maintained. It will also be noted that the axes of the lenses 21 and 22 are parallel to each other.

In the modification of the invention shown in Fig. 8, the lenses 34 and 35 are mounted on a vertical frame 36 in the form of a sleeve through which runs a threaded shaft 37 operated by a suitable handle 38 to raise or lower the frame 36 and aline the lenses with the standard or modified aperture openings as above mentioned. In this instance the lenses are at slightly different distances from the vertical line of the shaft 37 so that their optical centers or axes will aline with the centers of the respective aperture openings as the lenses are adjusted. Laterally extending fingers 39 and 40 engage the support 41 on which the shaft 37 is mounted to keep the lenses from lateral swinging as they are moved vertically.

In Fig. 9 a further modification is illustrated in which the aperture opening wall 42 is provided with two spaced apertures 43 and 44 each having rear slots similar to that shown in Fig. 5 to receive slidable plates 45 and 46. These plates are adapted to permit light from the source 47 to pass through the apertures or not according to the position of the plates. In this showing the light beam 48 is preferably designed to be sufficiently broad to include both the apertures 43 and 44 so that the plates 45 and 46 may be adjusted to permit light to pass through both openings altho generally it is allowed to pass only through one of them at a time. In Fig. 10 the apertures 43 and 44 are more clearly indicated and shows that aperture 43 is the standard size aperture whereas the aperture 44 is of the modified size adapted for use with talking films. In this form of the invention the operator has only to adjust the plates 45 and 46 to determine through which aperture the light is to pass. It is to be noted that the lens combinations with this arrangement are fixed because there are separate and distinct apertures which are fixed, consequently there is no necessity to swing or move the lenses as before.

It will be seen, in this invention, that the projector is adapted to be used in connection with either the standard film or the modified film, and the optical system and the film apertures may be properly and readily adjusted and related with the utmost ease and dispatch.

While the improvement has been described in detail and with respect to a preferred form hereof, it is not desired that it be limited to such details or form since many modifications and changes may be made and the invention embodied in other forms without departing from the spirit and scope of the invention in its broader aspects. Hence it is desired to cover all modifications and forms coming within the language or scope of any one or more of the appended claims.

What is claimed, is,

1. In a motion picture projection machine having a projection aperture capable of being unsymmetrically varied in size to give openings with different centers, a pivoted frame on the machine adjacent said aperture, a plurality of lenses on said frame at different distances from the pivot point thereof, said lenses having different focal lengths and adapted respectively when swung into alignment with the respective openings to maintain the same center and area of screen irrespective of which opening is employed.

2. In a picture projection machine having a projection aperture, a slide plate held adjacent to said projection aperture, and having openings of various sizes therein to be presented in registry with the projection aperture to unsymmetrically change the size of the opening through which the projection light passes, a lens support movable about a fixed axis with respect to said projection aperture, a plurality of lenses mounted in said support, each lens disposed in said support at a different distance from the fixed axis thereof so as to register with the center of one of the various openings in said plate when the selected lens is brought into registry with the selected opening in said slide plate.

3. In a motion picture projection machine having a projection aperture therein, a plate having different sized apertures provided therein and adapted to be placed adjacent said projection aperture to vary the size and centers of projected pictures passing therethrough, a frame pivoted in a fixed position in said machine, the pivot point of said frame lying in a plane passing through the center of said projection aperture and through the centers of the openings in said plate, a series of lenses mounted in said frame and adapted at selected times to be brought into registry with said projection aperture, said lenses being positioned in said frame at different radial distances from the pivot point of said frame so as to have the center of any one lens register with one of the openings in said plate when the opening is in registry with the projection aperture.

4. In a motion picture projection machine having a projection aperture therein, a plate with an opening therein adapted to be placed adjacent said projection aperture to vary the size of the said aperture unsymmetrically to vary the center of said aperture, a frame pivoted in a fixed position in said machine, lenses mounted in said frame at different radial distances from the center and adapted to register with said projection aperture, or with the modified aperture opening, the pivot point of said frame lying in a plane which passes through the centers of said projection aperture and said modified aperture opening.

5. A motion picture projection machine having a projection aperture therein, a plate having a plurality of openings therein of different sizes, said plate adapted to be placed adjacent said projection aperture to have one of said openings brought into registry with said projection aperture to vary the size of said aperture unsymmetrically to vary the center of the aperture projection, the center of said projection aperture and the centers of said openings in the plate lying in a single plane, a frame pivoted in a fixed position in said machine, lenses mounted in said frame and said modified aperture and adapted to be brought into registry with the projection aperture or with one of the modified size openings in the plate which has been brought into registry with the projection aperture, the pivot point of said frame lying in the same plane as the centers of the projection aperture and the openings in said plate.

AUGUSTO DINA.